T. H. TATLOW, Jr.
Seed Planter.
No. 24,248.  Patented May 31, 1859.
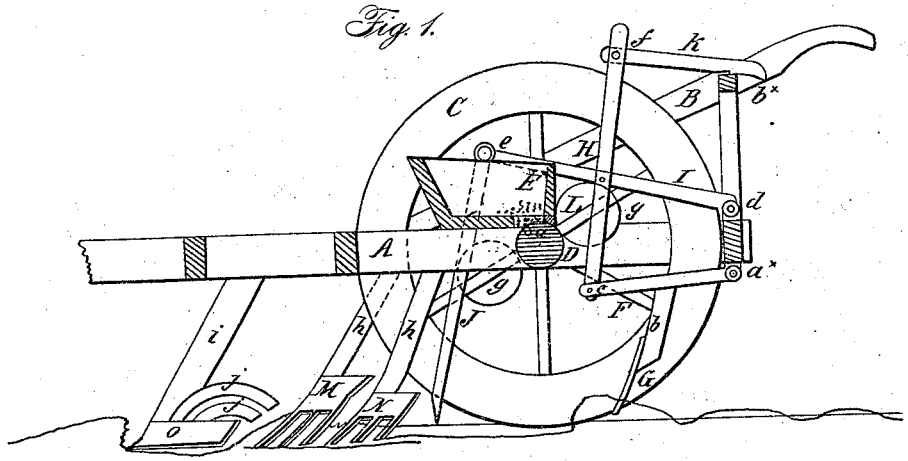
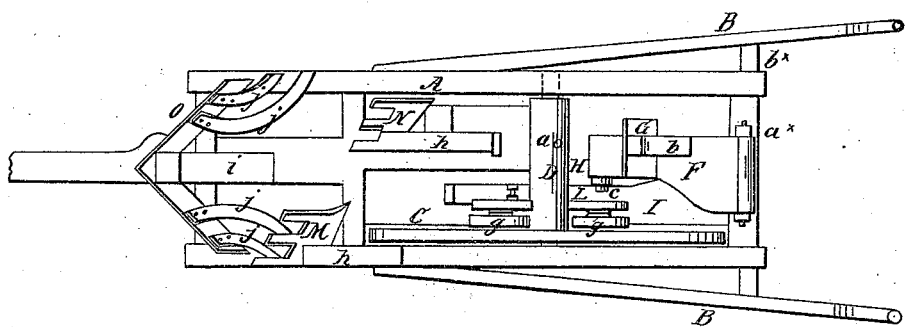
Witnesses:
Inventor:

UNITED STATES PATENT OFFICE.

THOMAS H. TATLOW, JR., OF PALMYRA, MISSOURI.

IMPROVEMENT IN SEEDING-MACHINES.

Specification forming part of Letters Patent No. 24,248, dated May 31, 1859.

*To all whom it may concern:*

Be it known that I, T. H. TATLOW, Jr., of Palmyra, in the county of Marion and State of Missouri, have invented a new and Improved Seeding-Machine; and I do hereby declare that the following is a full, clear, and exact description of the same, reference being had to the annexed drawings, making a part of this specification, in which—

Figure 1 is a side sectional view of my invention. Fig. 2 is an inverted plan of the same.

Similar letters of reference indicate corresponding parts in the two figures.

This invention relates to a novel means employed for covering the seed, and also to a novel device for properly pulverizing the ground in advance of the share that forms the furrow which receives the seed. The invention is designed to cover the seed more perfectly than has been hitherto done by a machine, and to imitate, as far as practicable, the covering of the seed by hand.

To enable those skilled in the art to fully understand and construct my invention, I will proceed to describe it.

A represents the frame of the machine; B B, the handles; C, the supporting-wheel, the axle D of which is at the bottom of the seed-box E, is provided with a seed-cell, $a$, one or more, and forms the seed-distributing device, as shown plainly in Fig. 1.

To the under side of the back part of the frame A there is attached, by a joint, $a^\times$, a bar, F, and to the under side of said bar F a pendant, $b$, is attached, having a hoe, G, secured to it. The front end of the bar F is connected by a bolt or pivot, $c$, to the lower end of a rod, H, and this rod is connected about at its center with a bar, I, the outer or back end of which is attached by a joint, $d$, to the back part of the frame A.

To the front end of bar I a rod, J, is attached by a pivot or bolt, $e$.

To the upper end of rod H an arm, K, is secured by a pivot or bolt, $f$.

To one side of the supporting-wheel C two friction-rollers, $g\ g$, are attached at equal distances from its hub or axle, and through the axle a bar, L, passes and projects therefrom at equal distances from opposite sides, as shown clearly in Fig. 1.

To the under side of the frame A two inclined pendent bars, $h\ h$, are attached, and to each bar $h$ there is secured a pronged share, which are designated by M N, the share M being somewhat in advance of share N, and the former being in front of the wheel C and the latter in front of the seed-distributing device.

To the under side of the front part of the frame A an inclined pendent bar, $i$, is attached, and to this bar a double share, O, is secured.

To each side of the share O two curved bars, $j\ j$, are attached.

The operation of the machine is as follows: As the machine is drawn along the share O penetrates the earth, working entirely beneath it, and pulverizing the same, while the curved bars $j\ j$ cast off all weeds, grass, &c., to either side of the machine. The share M levels the earth in front of wheel C and throws a light friable mold in front of the share N, which forms a furrow therein to receive the seed which is distributed from the box E by the cell or cells $a$ in axle D. The seed is covered by the hoe G which is operated as the machine moves along in consequence of the rollers $g\ g$ raising the bar I at intervals, the hoe as it descends entering the earth, and as it rises and moves forward by the movement of the machine, throwing the earth on the seed and covering the same, similar to the usual hand process. The rod J descends with the hoe G and penetrates the earth, and insures by the forward movement of the machine the elevation of the hoe G in case the wheel C should become locked in consequence of the weight of hoe G—a contingency which might occur if the hoe G penetrates the earth deeply.

When the operation of the hoe G is not required it may be kept in an elevated state by drawing back the arm K so that it will catch over a bar, $b^\times$, between the handles B, the arm K being provided with a notch for such purpose.

By this invention the seed will be covered with loose friable earth, the action of the hoe G having a tendency to produce such result, whereas the usual covering-shares have a tendency to fill in the furrows with compact earth, however much it may have been loosened by shares in advance, the shares turning the earth in slices into the furrows. The loosening of the soil is fully consummated in my invention by the shares O M N, and as the action of the hoe G has no tendency to compact the earth, but a reverse action, the seed will be properly covered.

Having thus described my invention, what I claim as new, and desire to secure by Letters Patent, is—

1. The employment or use of the covering-hoe G, operated from the supporting-wheel C through the medium of the rollers $g\ g$, bar J, and the bars F I, connected by the rod H, substantially as described.

2. The share O, provided with the curved bars $j\ j$, in connection with the shares M N and hoe G, the whole being arranged for joint operation, substantially as and for the purpose set forth.

THOS. H. TATLOW, JR.

Witnesses:
JOS. R. WINCHELL,
JOSEPH A. LAFON.